US008929566B2

(12) United States Patent
Kaulberg et al.

(10) Patent No.: US 8,929,566 B2
(45) Date of Patent: Jan. 6, 2015

(54) AUDIO PROCESSING IN A PORTABLE LISTENING DEVICE

(75) Inventors: Thomas Kaulberg, Smørum (DK); Lars Skovby, Smørum (DK)

(73) Assignee: Oticon A/S, Smorum (DK)

( * ) Notice: Subject to any disclaimer, the term of this patent is extended or adjusted under 35 U.S.C. 154(b) by 1025 days.

(21) Appl. No.: 12/690,787

(22) Filed: Jan. 20, 2010

(65) Prior Publication Data

US 2011/0019838 A1 Jan. 27, 2011

(30) Foreign Application Priority Data

Jan. 23, 2009 (EP) .................................... 09151253

(51) Int. Cl.
*H03G 5/00* (2006.01)
*H03G 3/00* (2006.01)

(Continued)

(52) U.S. Cl.
CPC ............ *H04R 5/04* (2013.01); *G10L 2021/065* (2013.01); *H04R 25/554* (2013.01); *H04R 1/10* (2013.01); *H04R 2420/07* (2013.01); *H04R 25/43* (2013.01); *H04R 25/505* (2013.01); *H04R 2460/03* (2013.01); *Y02B 60/50* (2013.01); *G10L 21/038* (2013.01); *H04R 5/033* (2013.01)
USPC ............... 381/98; 381/61; 381/312; 381/323; 381/320; 381/321; 704/500

(58) Field of Classification Search
CPC ............. H03G 3/00; H03G 5/00; H04R 25/00
USPC ............... 381/61, 98–99, 312, 323, 320–321; 704/500, 258
See application file for complete search history.

(56) References Cited

U.S. PATENT DOCUMENTS 5,812,598 A 9/1998 Sharma et al.
5,832,097 A * 11/1998 Armstrong et al. ........... 381/321

(Continued)

FOREIGN PATENT DOCUMENTS

EP 1460769 A1 9/2004
EP 1367566 B1 8/2005

(Continued)

OTHER PUBLICATIONS

Seltzer et al., "Robust Bandwidth Extension of Noise-corrupted Narrowband Speech," Interspeech 2005, Sep. 4-8, 2005, Lisbon, Portugal, pp. 1509-1512.

(Continued)

*Primary Examiner* — Disler Paul
(74) *Attorney, Agent, or Firm* — Birch, Stewart, Kolasch & Birch, LLP

(57) ABSTRACT

The invention relates to a method of processing an audio signal in a portable listening device, the audio signal comprising a low frequency part having an LF-bandwidth $\Delta f_{LF}$ and a high-frequency part having a HF-bandwidth $\Delta f_{HF}$. The invention further relates to a listening device and to a listening system. The object of the present invention is to improve performance or save power in a portable listening device. The problem is solved in that the method comprises a) providing an audio input signal consisting of said low frequency part having an LF-bandwidth $\Delta f_{LF}$; b) performing at least one signal processing step on the low frequency part of the audio signal; and c) performing a bandwidth extension process on said low frequency part of the audio signal to generate said high-frequency $_{part}$ of the audio signal, thereby generating or regenerating said audio output signal with a full bandwidth $\Delta f_{full}$ comprising said LF-bandwidth $\Delta f_{LF}$ and said HF-bandwidth $\Delta f_{HF}$. An advantage of this is that power consumption is reduced. The invention may e.g. be used for portable communication device, mobile telephones or listening devices, such as a hearing aids, ear protection devices, headsets, head phones, etc.

12 Claims, 5 Drawing Sheets

(51) Int. Cl.

| | |
|---|---|
| ***H04R 5/04*** | (2006.01) |
| ***G10L 21/038*** | (2013.01) |
| *G10L 21/06* | (2013.01) |
| *H04R 25/00* | (2006.01) |
| *H04R 1/10* | (2006.01) |
| *H04R 5/033* | (2006.01) |

(56) References Cited

U.S. PATENT DOCUMENTS

| | | | | |
|---|---|---|---|---|
| 6,694,034 | B2 * | 2/2004 | Julstrom et al. | 381/315 |
| 7,734,462 | B2 * | 6/2010 | Kabal et al. | 704/201 |
| 8,095,374 | B2 * | 1/2012 | Tanrikulu | 704/500 |
| 8,244,547 | B2 * | 8/2012 | Sudo et al. | 704/500 |
| 8,284,955 | B2 * | 10/2012 | Bonglovi et al. | 381/98 |
| 8,422,708 | B2 * | 4/2013 | Elmedyb et al. | 381/318 |
| 8,559,648 | B2 * | 10/2013 | Christoph | 381/71.12 |
| 2005/0255843 | A1 | 11/2005 | Hilpisch et al. | |
| 2007/0124140 | A1 | 5/2007 | Iser et al. | |
| 2008/0177539 | A1 | 7/2008 | Huang et al. | |
| 2008/0298602 | A1 * | 12/2008 | Wolff et al. | 381/66 |
| 2009/0132260 | A1 * | 5/2009 | Tanrikulu | 704/500 |
| 2011/0096933 | A1 * | 4/2011 | Eastty | 381/56 |
| 2011/0150244 | A1 * | 6/2011 | Lin et al. | 381/120 |

FOREIGN PATENT DOCUMENTS

| | | | |
|---|---|---|---|
| EP | 1638083 | A1 | 3/2006 |
| EP | 1796082 | A1 | 6/2007 |
| EP | 1981253 | A1 | 10/2008 |
| WO | WO-2004/086816 | A1 | 10/2004 |
| WO | WO-2005/004114 | A1 | 1/2005 |
| WO | WO-2006/074655 | A1 | 7/2006 |
| WO | WO-2007/006658 | A1 | 1/2007 |

OTHER PUBLICATIONS

Murakami et al, "Speech enhancement based on a combined higher frequency regeneration technique and RBF networks", IEEE TENCON' 02, vol. 1, Oct. 28, 2002, pp. 457-560.

Henning Puder, "Adaptive signal processing for interference cancellation in hearing aids", Signal Processing, Elsevier B.V., vol. 86, (2006), pp. 1239-1253.

* cited by examiner

AUDIO PROCESSING IN A PORTABLE LISTENING DEVICE

TECHNICAL FIELD

The invention relates to audio processing in portable devices with a view to keeping power consumption relatively low. The invention relates specifically to a method of processing an audio signal in a portable listening device, the audio signal comprising a low frequency part having an LF-bandwidth $\Delta f_{LF}$ and a high-frequency part having a HF-bandwidth $\Delta f_{HF}$.

The invention furthermore relates to a portable listening device, a listening system and a method of operating a listening device.

The invention may e.g. be useful in applications such as portable communication device, mobile telephones or listening devices, such as a hearing aids, ear protection devices, headsets, head phones, etc.

BACKGROUND ART

The frequency resolution of the human auditory system is much less at high frequencies than at low frequencies due to the logarithmic nature of the human frequency resolution. This fact combined with the fact that most audio signals contain a lot of information redundancy across frequencies has led to a technique called bandwidth extension. With the use of this technique a signal missing some frequency ranges can be reconstructed. One example of this technique is called Spectral Band Replication (SBR) (see e.g. EP 1367566 B1 or WO 2007/006658 A1). Due to the logarithmic nature of the human frequency resolution it is less complicated to reconstruct higher frequencies from lower frequencies than vice versa without audible artefacts.

Bandwidth extension is a well known technique used in applications like audio coding and telecommunication systems. In audio coding the purpose of bandwidth extension is to improve the coding efficiency. In telecommunication systems the purpose of bandwidth extension is to artificially increase a limited signal bandwidth.

[Murakami et al., 2002] describes e.g. a method of noise reduction, where the noise reduction is performed on a down sampled input signal and where subsequently a bandwidth extension (BWX) technique using a 'radial basis function' (RBF) network is applied to the noise reduced signal.

US2007/0124140 A1 describes the use of BWX in a telecommunication system, wherein a transmitted signal representing a telephone conversation, which in the transmission channel is limited to low frequencies, on the receiver side is enhanced using BWX.

DISCLOSURE OF INVENTION

The present invention utilizes bandwidth extension techniques in signal processing of an audio signal to improve performance or save battery power in a portable listening device, such as a hearing aid, an ear protection device, a headset or a pair of head phones.

The present invention relates to the processing and generation of an audio signal with a full bandwidth $\Delta f_{full}$ in a portable listening device, the audio signal comprising a low frequency (LF) part having an LF-bandwidth $\Delta f_{LF}$ and a high-frequency (HF) part having a HF-bandwidth $\Delta f_{HF}$, f denoting frequency.

Typically signal processing in a listening device is carried out on a full bandwidth signal. In an aspect of this invention, the bulk of the signal processing (e.g. analogue to digital (A/D-)conversion, time-frequency transformation, compression, noise reduction, feedback suppression, directionality, etc.) is carried out on a signal with a low frequency bandwidth (BW, e.g. BW=5 kHz). According to the Nyquist criterion a sample rate frequency ($F_s$) of twice the bandwidth is required (e.g. $F_s$=10 kHz). Signal components at higher frequencies (e.g. 5-10 kHz) are estimated from the lower frequencies with the use of bandwidth extension, e.g. just before the signal is fed to an output transducer (e.g. a receiver (speaker) unit) for presentation to a user, whereby power consumption is reduced.

In an aspect of this invention, an object is to reduce the load of a wireless link used for streaming audio to a listening device, whereby power consumption can be reduced or transmission range increased.

Objects of the present invention are to improve performance or save power in a portable listening device.

Objects of the invention are achieved by embodiments of the invention described in the accompanying claims and as described in the following.

A Method of Processing an Audio Signal:

In an aspect of the invention, there is provided a method of processing an audio signal in a portable listening device, the audio signal comprising a low frequency part having an LF-bandwidth $\Delta f_{LF}$ and a high-frequency part having a HF-bandwidth $\Delta f_{HF}$. The method comprises a) providing an audio input signal consisting of said low frequency part having an LF-bandwidth $\Delta f_{LF}$; b) performing at least one signal processing step on the low frequency part of the audio signal; and c) performing a bandwidth extension process on said low frequency part of the audio signal to generate said high-frequency part of the audio signal, thereby generating or regenerating an audio output signal with a full bandwidth $\Delta f_{full}$ comprising said LF-bandwidth $\Delta f_{LF}$ and said HF-bandwidth $\Delta f_{HF}$.

An advantage of this is that power consumption is reduced.

Bandwidth extension of band limited audio signals is e.g. discussed in EP 1 638 083 A1. In an embodiment, the bandwidth extension method used is adapted to the characteristics of signals, which the listening device is expected to be exposed to (music, speech, speech and noise, signal level, signal energy, etc.). In an embodiment, the listening device is adapted to use different bandwidth extension methods dependent upon characteristics of the acoustic input signal.

In an embodiment, the frequency range $\Delta f=[f_{min}; f_{max}]$ (where $f_{min}$ is a minimum frequency and $f_{max}$ is a maximum frequency) considered by the listening device (and thus of relevance to the audio signal comprising an LF-part of bandwidth $\Delta f_{LF}$ and a HF-part of bandwidth $\Delta f_{HF}$) is limited to a part of the typical human audible frequency range (20 Hz≤f≤20 kHz) and is divided into a number K of frequency bands (FB), ($FB_1$, $FB_2$, . . . , $FB_K$). In an embodiment, the number of bands K is larger than or equal to 2, e.g. K=8 or 16 or 32 or 64 or more.

In an embodiment, the audio signal is adapted to be arranged in time frames, each time frame comprising a predefined number N of digital time samples $x_n$ (n=1, 2, . . . , N), each time sample $x_n$ constituting a value of the signal (e.g. its amplitude) at a specific time $t_n$, corresponding to a frame length in time of $L=N/f_s$, where $f_s$ is a sampling frequency of an analog to digital conversion unit. In an embodiment, a time frame has a length in time of at least 8 ms, such as at least 24 ms, such as at least 50 ms, such as at least 80 ms. In an embodiment, the sampling frequency $f_s$ of an analog to digital conversion unit is larger than 1 kHz, such as larger than 4 kHz, such as larger than 8 kHz, such as larger than 16 kHz. In an embodiment, the sampling frequency is in the range between 1 kHz and 40 kHz, e.g. 10 kHz or 20 kHz. In an embodiment, the sampling frequency is different in different parts of the portable listening device. In an embodiment, time frames of the input signal are processed to a time-frequency representation by transforming the time frames on a frame by frame basis to provide corresponding spectra of frequency samples, the time frequency representation being constituted by TF-units each comprising a complex value (magnitude and phase) of the input signal at a particular unit in time and frequency. The frequency samples in a given time unit may be arranged in bands $FB_k$ (k=1, 2, . . . , K), each band comprising one or more frequency units (samples).

In an embodiment, one or more bands from the low-frequency part is/are used as donor band(s) and the spectral content of such donor band(s) is/are copied and possibly scaled to one or more target band(s) of the high-frequency part. A predefined scaling of the frequency content from the donor to the target band is e.g. determined to minimize artefacts in the signal. Such minimization may e.g. be achieved by means of a model of the human auditory system. The term 'spectral content of a band' is in the present context taken to mean the (complex) values of frequency components of a signal represented by the band in question. In general the spectral content at a given frequency comprises corresponding values of the magnitude and phase of the signal at that frequency at a given time (as e.g. determined by a time to frequency transformation of a time varying input signal at a given time or rather for a given time increment at that given time). In an embodiment, only the magnitude values of the signal are considered.

In a particular embodiment, the high-frequency part of the signal is reconstructed by spectral band replication. In an embodiment, one or more bands from a low-frequency part of the signal is/are used for reconstructing the high-frequency part of the signal. Details of spectral band replication in general are e.g. discussed in EP 1 367 566 B1 and in connection with application in a listening device, such as a hearing aid, in WO 2007/006658 A1.

In general, it is anticipated that the range constituted by $\Delta f_{full}$ is substantially equal to the sum of $\Delta f_{LF}$ and $\Delta f_{HF}$. It is, however, intended that the $\Delta f_{LF}$ and $\Delta f_{HF}$ may constitute non-adjacent ranges of the audible frequency range (typically considered to be between 20 Hz and 20 kHz), $\Delta f_{LF}$ defining a frequency range between a minimum LF-frequency $f_{LF,min}$ and a maximum LF-frequency $f_{LF,max}$ and $\Delta f_{HF}$ defining a frequency range between a minimum HF-frequency $f_{HF,min}$ and a maximum HF-frequency $f_{HF,max}$ where $f_{LF,max} \leq f_{HF,min}$.

In an embodiment, the frequency ranges $\Delta f_{LF}$ and $\Delta f_{HF}$ are separated by a predetermined LF-HF separation frequency $f_{LF-HF}$. The term 'separated by a predetermined LF-HF frequency $f_{LF-HF}$ can include the case where the LF-HF frequency is located in a frequency range between $\Delta f_{LF}$ and $\Delta f_{HF}$ (between $f_{LF,max}$ and $f_{HF,min}$), and NOT being a common end-point of the ranges $\Delta f_{LF}$ and $\Delta f_{HF}$ (i.e. where the two ranges $\Delta f_{LF}$ and $\Delta f_{HF}$ are separated by an intermediate range). In an embodiment, $f_{LF-HF}=f_{LF,max}=f_{HF,min}$. In an embodiment, the LF-bandwidth $\Delta f_{LF}$ constitutes 0.7 times or less of the full bandwidth $\Delta f_{full}$ of the audio signal, such as 0.5 times or less, such as 0.4 times or less, such as 0.25 times or less of the full bandwidth of the audio signal. In an embodiment, the LF-bandwidth $\Delta f_{LF}$ constitutes 0.5 times or more (such as 0.6 times or more, such as 0.7 times or more) of the full bandwidth $\Delta f_{full}$ of the audio signal considered by the listening device (e.g. as presented to a user via an output transducer).

In a particular embodiment, the predetermined separation frequency $f_{LF-HF}$ is in the range between 2 kHz and 8 kHz, such as between 3 kHz and 7 kHz, such as between 4 kHz and 6 kHz, e.g. around 5 kHz.

In a particular embodiment, the low-frequency part has a minimum frequency $f_{LF,min}$ in the range from 3 Hz to 300 Hz, such as from 5 Hz to 100 Hz, such as 20 Hz.

In a particular embodiment, the high-frequency part has a maximum frequency $f_{HF,max}$ in the range from 4 kHz to 20 kHz, such as from 7 kHz to 12 kHz, such as around 10 kHz.

Preferably, the at least one signal processing step performed on the low frequency part of the signal include(s) the more power consuming steps, such as one or more (such as a majority, or all) of wireless transmission/reception, A/D-conversion, time-frequency conversion, signal processing, such as extraction of directional information, providing an appropriate frequency dependent gain profile, compression, noise reduction, acoustic feedback suppression, etc.

In a particular embodiment, the low frequency part of the audio signal is picked up by an input transducer, e.g. a microphone, of the portable listening device. In an embodiment, the audio signal is converted to a digital signal by an analogue to digital (AD) converter. In an embodiment, the analogue to digital converter is sampled by a first sample rate $F_{s1}$ adapted to provide said low frequency part having an LF-bandwidth $\Delta f_{LF}$ (whereby power is saved compared to using a higher sampling rate to provide a full bandwidth signal). In an embodiment, the audio signal is filtered to provide said low frequency part having an LF-bandwidth $\Delta f_{LF}$.

In a particular embodiment, the low frequency part of the audio signal (or a part thereof) is received by the portable listening device from another device, e.g. from an audio gateway or an entertainment device, e.g. a music player or a mobile telephone, via a wired or wireless connection. In a particular embodiment, the low frequency part of the audio signal is wirelessly transmitted to the portable listening device.

In a particular embodiment, the full bandwidth audio output signal is fed to a digital to analogue (DA) converter. In an embodiment, the digital to analogue converter is sampled by a second sample rate $F_{s2}$ (adapted to correspond to the full bandwidth signal reconstructed by bandwidth extension. In a particular embodiment, the full bandwidth audio output signal or the DA-converted full bandwidth audio output signal is fed to an output transducer, e.g. a receiver (speaker), for presentation to a wearer of the portable listening device. Alternatively, the output transducer can be electrodes of a cochlear implant or an electromechanical transducer of a bone conduction device.

In an embodiment, the first sample rate $F_{s1}$ is smaller than the second sample rate $F_{s2}$. In a particular embodiment, ratio of the first sample rate $F_{s1}$ to the second sample rate $F_{s2}$ is equal to the ratio of the bandwidth $\Delta f_{LF}$ of the low frequency part to the full bandwidth $\Delta f_{full}$ of the audio signal, such as e.g. 0.7 or less 0.5 or less or 0.4 or less or 0.25 or less.

In a particular embodiment, the listening device comprises a hearing aid, an ear protection device, a headset, or a head phone or a combination thereof.

A tangible computer-readable medium storing a computer program comprising program code means for causing a data processing system to perform at least some (such as at least steps b) and c), such as all) of the steps of the method described above, in the detailed description of 'mode(s) for carrying out the invention' and in the claims, when said computer program is executed on the data processing system is furthermore provided by the present invention. In addition to being stored on a tangible medium such as diskettes, CD- ROM-, DVD-, or hard disk media, or any other machine readable medium, the computer program can also be transmitted via a transmission medium such as a wired or wireless link or a network, e.g. the Internet, and loaded into a data processing system for being executed at a location different from that of the tangible medium.

A data processing system comprising a processor and program code means for causing the processor to perform at least some (such as at least steps b) and c), such as all) of the steps of the method described above, in the detailed description of 'mode(s) for carrying out the invention' and in the claims is furthermore provided by the present invention.

A Portable Listening Device:

In a further aspect, there is provided a portable listening device comprising a signal processor adapted for processing a low frequency bandwidth input audio signal and providing a processed low bandwidth signal and a bandwidth extension unit adapted to provide a full bandwidth output signal based on the processed low bandwidth signal.

It is intended that the process features of the method described above, in the detailed description of 'mode(s) for carrying out the invention' and in the claims can be combined with the (portable listening) device, when appropriately substituted by a corresponding structural feature and vice versa. Embodiments of the device have the same advantages as the corresponding method.

In a particular embodiment, the portable listening device further comprises a microphone and an A/D-converter for generating the low frequency bandwidth input audio signal, or a part thereof (possibly using a filter, e.g. a low pass filter, e.g. a digital filter). In an embodiment, the analogue to digital (A/D) converter is sampled by a first sample rate $F_{s1}$. By using a relatively low sampling rate $F_{s1}$ in the A/D-converter corresponding to the LF-bandwidth of the low frequency bandwidth signal, power is saved (compared to converting a full-bandwidth signal) and a filter can be omitted.

In a particular embodiment, the signal processor is a digital signal processor.

In a particular embodiment, the portable listening device comprises a time to time-frequency conversion unit (and a corresponding time-frequency to time conversion unit) to provide a time-varying input signal in a number of frequency bands or ranges (and for synthesizing a time-varying output signal from a number of processed band specific signals). In a particular embodiment, the signal processor is adapted to process the low frequency bandwidth input signal in a number of separate frequency bands or ranges. In an embodiment, the bandwidth extension unit is adapted to operate on each of the separate frequency bands or ranges (cf. e.g. FIGS. 1 and 6 in WO 2007/006658 A1 and the corresponding description).

In a particular embodiment, the bandwidth extension unit providing the full bandwidth ($\Delta f_{full}$) output signal is sampled with a second sample rate $F_{s2}$. In a particular embodiment, the ratio of the first sample rate $F_{s1}$ to the second sample rate $F_{s2}$ is equal to the ratio of the bandwidth $\Delta f_{LF}$ of the low frequency part to the full bandwidth $\Delta f_{full}$ of the audio signal, such as e.g. 0.7 or less, 0.5 or less, or 0.4 or less, or 0.25 or less.

In a particular embodiment, the full bandwidth audio output signal is fed to a digital to analogue (DA) converter for converting a digital full bandwidth output signal to an analogue full bandwidth output signal. In an embodiment, the digital to analogue converter is sampled by a second sample rate $F_{s2}$. In a particular embodiment, the portable listening device further comprises an output transducer, e.g. a receiver (speaker), for presenting the full bandwidth output signal to a wearer of the listening device. Alternatively, the output transducer can be electrodes of a cochlear implant or an electro-mechanical transducer of a bone conduction device.

In a particular embodiment, the portable listening device further comprises a wireless interface adapted to receive said low frequency bandwidth input audio signal (or a part thereof) from another device via a wireless link. In an embodiment, the wireless interface comprises antenna and receiver or transceiver circuitry, the receiver or transceiver circuitry e.g. comprising an appropriate demodulation unit to extract an audio signal (e.g. including or constituted by a low frequency part of bandwidth $\Delta f_{LF}$) from the received wireless signal. In an embodiment, the antenna and receiver or transceiver circuitry comprises an induction coil and corresponding circuitry for receiving (and possibly transmitting) a signal from (to) another device via an inductive coupling to a corresponding induction coil in the other device. Alternatively, the antenna and the receiver or transceiver circuitry are adapted for far-field (radiated field) communication. In an embodiment, the listening device comprises a selector or mixing unit receiving inputs from the microphone and the wireless interface, the selector or mixing unit being adapted for providing as an output one of the inputs or a weighted mixture of the inputs. In an embodiment, a first sub-part of the low frequency part of the audio signal (comprising a first part $\Delta f_{LF\text{-}1}$ of the LF-bandwidth $\Delta f_{LF}$) is picked up by the microphone and fed to the selector or mixing unit as a first input and a second sub-part of the low frequency part of the audio signal (comprising a second part $\Delta f_{LF\text{-}2}$ of the LF-bandwidth $\Delta f_{LF}$) is received via the wireless interface and fed to the selector or mixing unit as a second input. In an embodiment, the selector or mixing unit is adapted to combine the first and second inputs to provide a combined low frequency part of the audio signal to the signal processing unit, the combined signal having an LF-bandwidth $\Delta f_{LF}$. This has the advantage that even less link-bandwidth is required (thereby saving power or enabling an increased transmission range).

In a particular embodiment, the portable listening device comprises an analyzing unit for determining a type of input signal and for providing a control signal indicative of the type. In a particular embodiment, the bandwidth extension unit comprises several different schemes for providing bandwidth extension depending on a control signal.

In a particular embodiment, the listening device comprises a hearing aid or a head set or an active ear plug or a headphone or a combination thereof.

In a particular embodiment, the portable listening device is adapted to provide a full bandwidth output signal according to the method described above, in the section on 'Mode(s) for carrying out the invention', in the drawings or in the claims.

A Listening System:

In a further aspect, there is provided a listening system comprising first and second devices, the first device being a portable listening device adapted for presenting an electrical output audio signal to a wearer of the first listening device, the electrical output audio signal having a full bandwidth $\Delta f_{full}$ comprising a low frequency part and a high frequency part, wherein the second device comprises a wireless transmitter for wirelessly transmitting the low frequency signal and the first device comprises a) a wireless receiver for receiving said low frequency signal and b) a bandwidth extension unit for constructing or (re-)generating a high-frequency part of the electrical output audio signal, the high-frequency part having a HF-bandwidth $\Delta f_{HF}$, and for forming the electrical output audio signal having a full bandwidth $\Delta f_{full}$ based on or comprising said low frequency signal having an LF-bandwidth $\Delta f_{LF}$ and said high frequency signal having a HF-bandwidth $\Delta f_{HF}$.

It is intended that the process features of the method described above, in the detailed description of 'mode(s) for carrying out the invention' and in the claims can be combined with the system, when appropriately substituted by a corresponding structural feature and vice versa. Embodiments of the system have the same advantages as the corresponding method.

In a particular embodiment, the first device comprises a signal processor adapted for processing the low frequency input signal and providing a processed low frequency output signal to the bandwidth extension unit.

In an embodiment, the second device comprises an input transducer for converting an input sound to an electric input signal and a frequency limiting unit, e.g. a low pass filter and/or an A/D converter unit, for generating said low frequency part of a signal having an LF-bandwidth $\Delta f_{LF}$ (or at least a part thereof) for being wirelessly transmitted to the first device. In a particular embodiment, the second device is a portable device. In a particular embodiment, the (first) portable listening device comprises an input transducer for converting an input sound to an electric input signal and an A/D-converter for generating the low frequency bandwidth input audio signal sampled by a first sample rate $F_{s1}$. By using a relatively low sampling rate $F_{s1}$ in the A/D-converter corresponding to the LF-bandwidth of the low frequency bandwidth signal, power is saved (compared to converting a full-bandwidth signal).

In a particular embodiment, the wireless transmitter and receiver are adapted to provide a near-field communication system, e.g. based on an inductive coupling between (antenna coils located in, respectively) the first and second devices on which said transmission of said low frequency signal can be based, when said first and second devices are located in an operational distance from each other. Such system is e.g. described in US 2005/0255843 A1. Alternatively, the wireless transmission link established by the wireless transmitter and receiver may be based on radiated fields. The wireless link may be adapted to use analogue (e.g. FM or AM) or digital modulation, e.g. according to the Bluetooth or DECT standard.

In an embodiment, the second device comprises an electric interface for receiving a signal comprising an audio signal (e.g. from a mobile telephone or an entertainment device) and providing an electric input signal based thereon (e.g. comprising or consisting of the audio signal), and a frequency limiting unit, e.g. low pass filter and/or an A/D conversion unit, for generating said low frequency part of a signal having an LF-bandwidth $\Delta f_{LF}$ (or a part thereof) for being wirelessly transmitted to the first device from said electric input signal.

In a particular embodiment, the first (portable listening) device comprises a portable listening device as described above, in the section on 'Mode(s) for carrying out the invention', in the drawings or in the claims.

In a particular embodiment, the second device is selected from the group comprising a listening device (e.g. a hearing aid of a binaural system), a mobile telephone, an audio selection device (e.g. an audio gateway adapted for receiving a number of audio signals and for transmitting a selected one to the first device), a TV-set, a PC, an audio-player (e.g. a portable music player) and combinations thereof.

In a particular embodiment, the second device comprises an audio gateway comprising a number of interfaces adapted for receiving a number of audio signals and for transmitting a selected one to the first device. In an embodiment, the audio gateway comprises an interface (such as a wireless interface, e.g. a Bluetooth or DECT interface) to a mobile telephone. In an embodiment, the audio gateway comprises an interface to an audio entertainment device, e.g. a player of music, e.g. recorded or streamed music. In an embodiment, the audio gateway comprises a user operable activation element adapted for selecting one of the audio signals received by the audio gateway for being transmitted to the first listening device (e.g. a hearing aid).

Typically, the first and/or second devices comprise(s) a local source of energy, e.g. a battery, such as a rechargeable battery.

A Method of Operating a Listening System Comprising Wirelessly Transferring an Audio Signal:

In a further aspect, a method of operating a listening system comprising wirelessly transferring a first audio signal between a transmitting device and a receiving device is provided, at least one of the transmitting and receiving devices forming part of a listening device, the first audio signal comprising a low-frequency part having an LF-bandwidth $\Delta f_{LF}$ and a high-frequency part having a HF-bandwidth $\Delta f_{HF}$, the first audio signal having an input bandwidth $\Delta f_i$ and being sampled at an input sampling frequency $f_{s,i}$. The method comprises a) providing the following actions in the transmitting device
   - removing the high-frequency part of the first audio signal, thereby creating a reduced-bandwidth signal comprising the low-frequency part $\Delta f_{LF}$ of the first audio signal;
   - reducing the sampling frequency to a reduced sampling frequency $f_{s,red}$ compared to the input sampling frequency $f_{s,i}$ of the first audio signal;
   - transmitting the reduced bandwidth signal $\Delta f_{LF}$ to the receiving device; and b) providing the following actions in the receiving device:
   - receiving the reduced bandwidth signal $\Delta f_{LF}$;
   - resampling the received reduced bandwidth signal at a sampling rate $f_{s,inc}$ that is increased compared to the reduced sampling frequency $f_{s,red}$; and
   - reconstructing the high-frequency part $\Delta f_{HF}$ of the signal using a bandwidth extension technique.

In a particular embodiment, a full bandwidth signal is generated or reconstructed based on the low-frequency part and the (reconstructed) high-frequency part of the signal.

In a particular embodiment, the high-frequency part of the signal is reconstructed by spectral band replication.

In a particular embodiment, the low frequency part of the first audio signal has a maximum frequency $f_{LF,max}$ in the range between 3 kHz and 7 kHz, such as between 4 kHz and 6 kHz, e.g. 5 kHz.

In a particular embodiment, the low-frequency part of the first audio signal has a minimum frequency $f_{LF,min}$ in the range from 5 Hz to 100 Hz, such as 20 Hz.

In a particular embodiment, the high-frequency part of the first audio signal has a maximum frequency $f_{HF,max}$ in the range from 7 kHz to 20 kHz, e.g. from 8 kHz to 12 kHz, such as 10 kHz.

In a particular embodiment, the input sampling frequency $f_{s,i}$ is reduced to a reduced sampling frequency $f_{s,red}$ with a predefined reduction factor $K_{red}$. In a particular embodiment, the predefined reduction factor $K_{red}$ is in the range from 0.3 to 0.7, such as 0.5.

In a particular embodiment, the reduced sampling frequency $f_{s,red}$ is increased to $f_{s,inc}$ with a predefined increase factor $K_{inc}$. In a particular embodiment, the predefined increase factor $K_{inc}$ is in the range from 1.5 to 2.5, such as 2.

In a particular embodiment, signal processing of the low frequency part of the first audio signal is provided in the receiving device prior to reconstructing the high-frequency part.

In a particular embodiment, the listening device comprises a hearing aid, an ear protection device, a headset or a pair of head phones or a combination thereof.

In a particular embodiment, the receiving device forms part of the listening device, e.g. comprising a hearing aid.

In a particular embodiment, the transmitting device forms part of a communication device, e.g. a mobile telephone, portable entertainment device, e.g. a music player, or an audio gateway for forwarding an audio signal to a receiving device. In a particular embodiment, the audio signal is selected among a multitude of audio signals.

Further objects of the invention are achieved by the embodiments defined in the dependent claims and in the detailed description of the invention.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present. Furthermore, "connected" or "coupled" as used herein may include wirelessly connected or coupled. As used herein, the term "and/or" includes any and all combinations of one or more of the associated listed items.

BRIEF DESCRIPTION OF DRAWINGS

The invention will be explained more fully below in connection with a preferred embodiment and with reference to the drawings in which.

The figures are schematic and simplified for clarity, and they just show details which are essential to the understanding of the invention, while other details are left out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

MODE(S) FOR CARRYING OUT THE INVENTION

Figure 1:
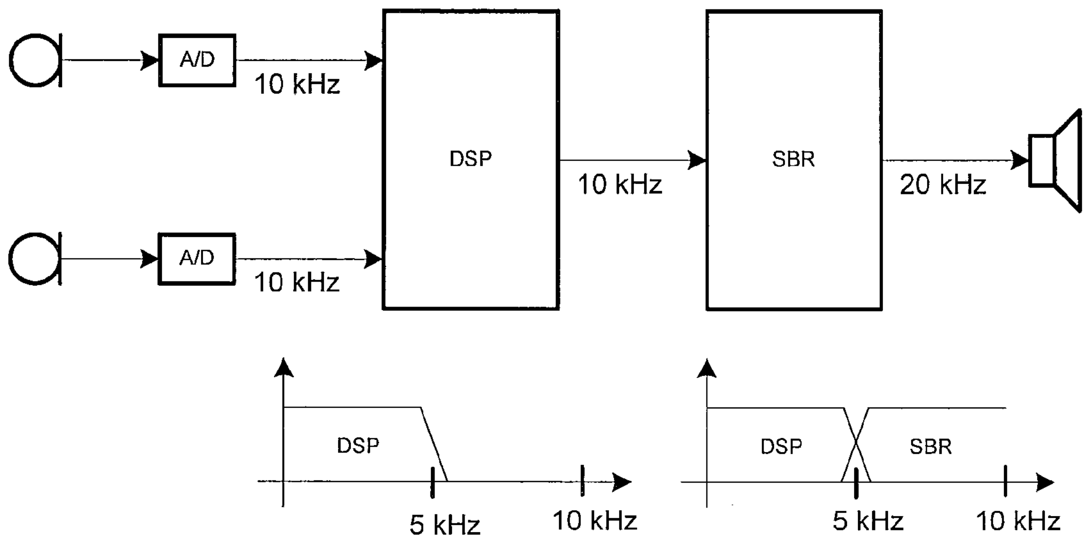
FIG. 1 shows a block diagram of a part of a listening device according to an embodiment of the invention comprising a signal path from a microphone to a receiver, FIG. 2 schematically illustrates steps of an embodiment of a method according to the present invention, the graphs indicating the bandwidth of frequency spectra of an audio signal in various steps of the method, $f_s$ denoting sampling frequency, SBR being short for Spectral Band Replication and DSP being short for Digital Signal Processing.

FIG. 1 shows a block diagram of a part of a listening system according to an embodiment of the invention comprising a listening device comprising a signal path from a microphone to a receiver (speaker). The listening device (e.g. a hearing aid) comprises a set of directional microphones for picking up sounds from the environment and converting them to an analogue electrical signal, which is fed to respective analogue-to-digital converters (A/D). The sampling frequency $F_{s1}$ of the A/D-converters is (here chosen to be) 10 kHz. The digitized output signals from the A/D-converters, having a bandwidth ($\Delta f_{LF}$) of 5 kHz, are fed to a digital signal processor (DSP) where they are processed to perform normal DSP-functions such as one or more of extraction of directional information, providing an appropriate gain profile, compression, feedback cancellation, noise reduction, etc., and providing a processed signal. The signal processing is typically performed independently in a number of subbands. The processed signal comprising 10 ksamples/s is fed to a bandwidth extension unit, here implemented as a unit adapted for performing Spectral Bandwidth Replication (indicated by SBR in FIG. 1). The bandwidth of the output signal from the SBR-unit is extended from 5 kHz ($\Delta f_{LF}$) to 10 kHz ($\Delta f_{Full}$) (the output signal comprising 20 ksamples/s, sampling frequency $F_{s2}$=20 kHz) and forwarded to a receiver (speaker) for being presented to a wearer of the listening device as an acoustical signal (possibly via a preceding digital to analogue converter). This has the advantage of saving power because the DSP-functionality is performed on the 'low bandwidth' signal.

The listening device of FIG. 1 may comprise a hearing instrument, a headset, an active ear protection device, a head phone, etc.

Figure 4:
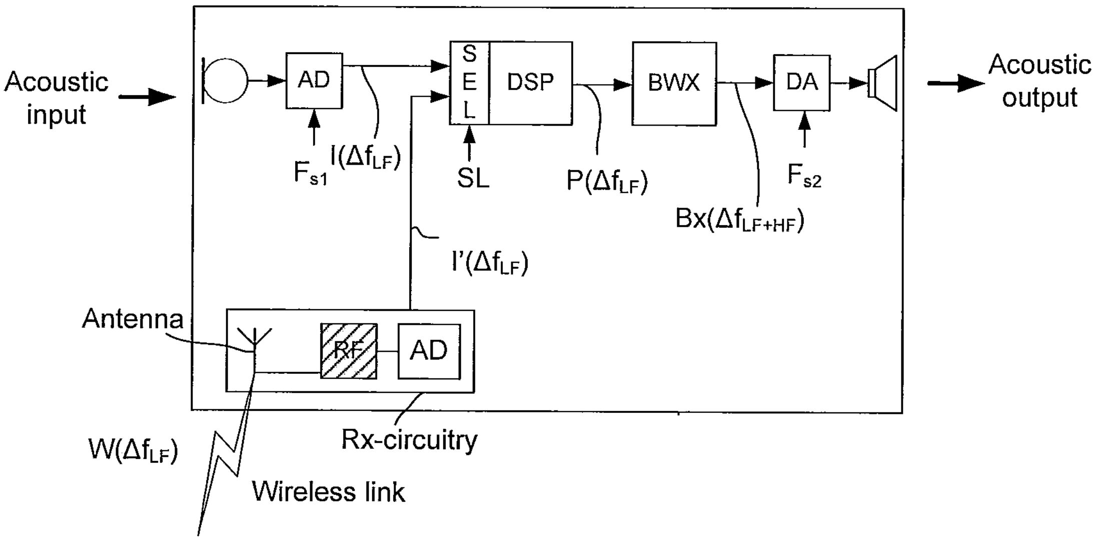
FIG. 4 shows a second embodiment of a listening device according to the invention.
Figure 5:
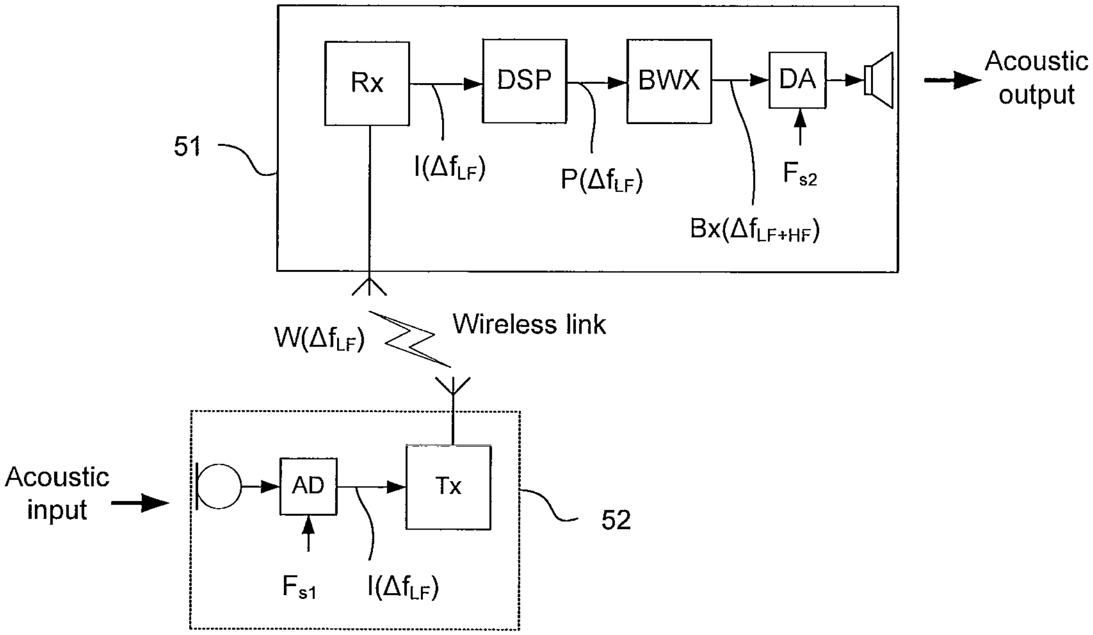
FIG. 5 shows an embodiment of a listening system according to the invention.

Instead of picking up an acoustical signal via one or more microphones (as shown in FIG. 1, a low bandwidth signal may be wirelessly transmitted to the listening device and received by a wireless receiver (comprising an antenna and receiver and demodulation circuitry) and forwarded to the DSP (cf. FIGS. 4, 5).

Figure 2:
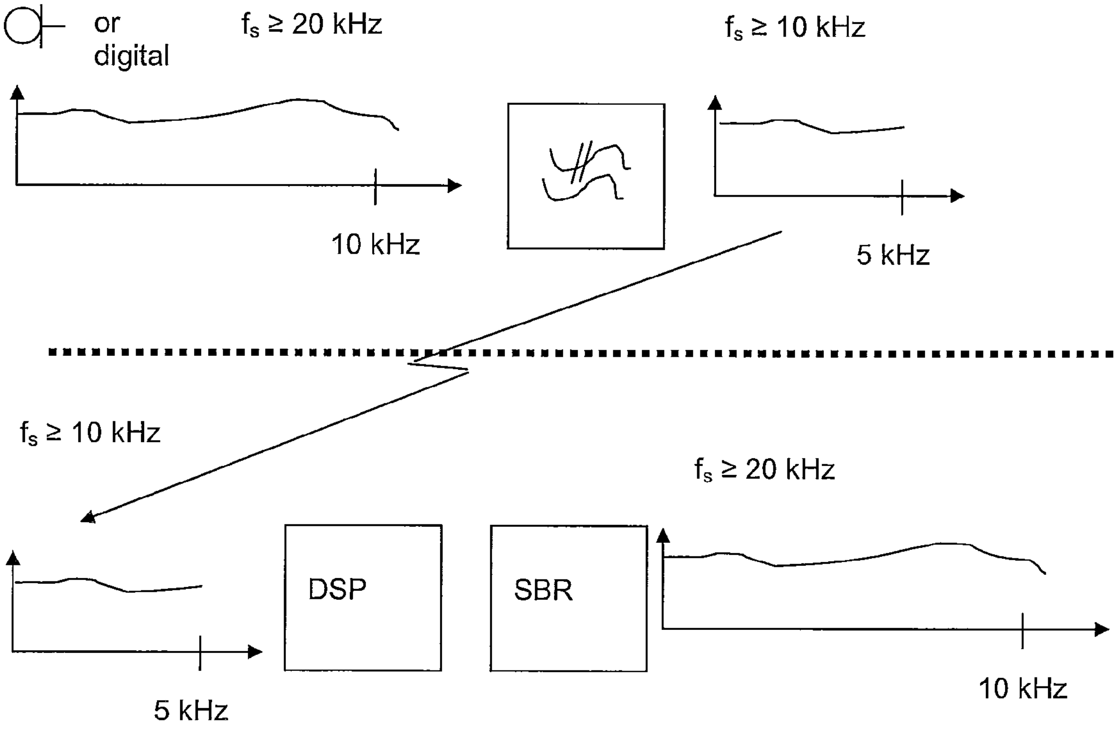

FIG. 2 shows steps of an embodiment of a method according to the present invention, the graphs indicating the bandwidth of frequency spectra of an audio signal in various steps of the method, fs denoting sampling frequency, SBR being short for Spectral Band Replication and DSP being short for Digital Signal Processing.

By reducing the bandwidth of the transmitted audio signal, the range of the transmitter can be increased or power in the transmitter and receiver can be saved.

An example of a method according to an embodiment of the invention comprises the following steps 1-6. Steps 1-2 are represented by the upper part of FIG. 2 (related to an audio source, e.g. a (second) communication device), step 3 is represented by the arrow connecting the upper and lower parts of FIG. 2 (separated by the dotted line), and steps 4-6 are represented by the lower part of FIG. 2 (related to an audio processing (and/or presentation) device, e.g. a (first) listening device):

Instead of transmitting a full-bandwidth audio at 20 kHz sampling frequency (bandwidth $\Delta f_{Full}$=10 kHz) do the following:

1. Reduce the bandwidth of the audio signal by low-pass filtering the signal to a low frequency part with an LF-bandwidth of e.g. 5 kHz (the audio signal being e.g. picked up by a (wireless) microphone or e.g. being based on an existing, e.g. stored, audio signal);

2. Reduce or set the sampling frequency $f_s=F_{s1}$ to 10 kHz;
3. Transmit the low frequency part with an LF-bandwidth of 5 kHz to the audio processing device (the transmit-rate is half of a full-band audio signal), e.g. via a wireless link, e.g. an inductive link, the audio processing device being e.g. a part of a hearing aid;
4. Process the low frequency part of the signal by a digital signal processor (DSP) in a conventional manner;
5. Re-sample the received signal to a (full bandwidth) 20 ksample/s signal ($\Delta f_{Full}=10$ kHz, $f_s=F_{s2}=20$ kHz);
6. Reconstruct the frequencies at 5-10 kHz ($\Delta f_{HF}$) with use of bandwidth extension techniques (here SBR is indicated).

Alternatively, step 4 and 5 could be reversed so that the high frequency part of the signal is reconstructed before signal processing and the combined, full bandwidth signal is processed by a digital signal processor (DSP) in a conventional manner. Alternatively, step 4 could be omitted altogether, if no processing (in excess of the reconstruction of the high frequency part of the signal) is needed.

A bandwidth extension technique denoted Spectral Band Replication (SBR) can advantageously be used, as e.g. described in EP 1 367 566, cf. in particular section [0007] and FIGS. 1-2 and corresponding parts of the description of preferred embodiments in EP 1 367 566.

Figure 3:
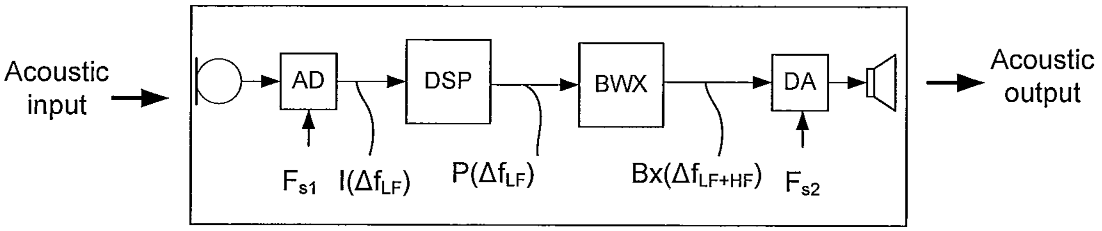
FIG. 3 shows a first embodiment of a listening device according to the invention.

FIG. 3 shows a first embodiment of a listening device according to the invention. The listening device, e.g. a hearing instrument, comprises a microphone for converting an Acoustic input signal to an electric audio input signal, which is digitized by an analogue to digital converter (AD) sampled by a first sampling frequency $F_{s1}$. The bandwidth $\Delta f_{LF}$ of the digitized signal $I(\Delta f_{LF})$ corresponds to a low frequency part of a full bandwidth audio signal (here $\sim F_{s1}/2$). The digitized signal $I(\Delta f_{LF})$ is fed to a signal processing unit (DSP), where the signal is processed according to a users needs (e.g. including applying a frequency dependent gain to the signal). The processed signal $P(\Delta f_{LF})$ is fed to a bandwidth extension unit (BWX), where a high frequency part of the signal is synthesized based on the processed low frequency part and combined with the processed low frequency part to form a full bandwidth output signal $Bx(\Delta f_{LF+HF})$. The full bandwidth output signal $Bx(\Delta f_{LF+HF})$ is fed to a digital to analogue converter (DA), which is clocked by a second sampling frequency $F_{s2}$, converting the digital signal to an analogue full bandwidth output signal, which is fed to a receiver (speaker) for being presented to a user. Preferably, $F_{s2}\geq 2\cdot F_{s1}$.

Characteristics of the present embodiment of the invention are that the listening device picks up (or filters the input signal to provide) only an LF-part of an Acoustic input signal (thereby saving power in the A/D-conversion etc.), processes only this LF-part of the signal (thereby saving power compared to the processing of a full bandwidth signal), generates a full bandwidth signal by an (possibly selectable according to the type of input signal) appropriate bandwidth extension method, presenting the full bandwidth signal for a user as an Acoustic output signal. In an embodiment, the listening device comprises an analyzing unit for determining a type of input signal and for providing a control output indicative of the type. In an embodiment, the bandwidth extension unit comprises several different schemes for providing bandwidth extension depending on a control input from an input signal analyzing unit.

FIG. 4 shows a second embodiment of a listening device according to the invention. The embodiment of FIG. 4 comprises the same elements as the embodiment shown in FIG. 3 and mentioned above. Additionally, the listening device comprises a wireless interface (at least) for receiving an audio signal from another device via a Wireless link. The transceiver (Rx-circuitry in FIG. 4) comprises an Antenna (adapted to the frequency, bandwidth and modulation of the transmitted signal $W(\Delta f_{LF})$ for receiving a signal $W(\Delta f_{LF})$ comprising a low frequency part of an audio signal (having an LF-bandwidth $\Delta f_{LF}$) and receiver and demodulation circuitry (RF and AD-units in FIG. 4) for extracting the low frequency part $I'(\Delta f_{LF})$ of the audio signal. The low frequency part $I'(\Delta f_{LF})$ of the audio signal is fed to a selector unit (SEL) together with the digitized signal $I(\Delta f_{LF})$ based on the Acoustic input signal picked up by the microphone of the listening device. The selector unit (SEL) selects one of the two inputs based on a select input signal (SL) or provides a mixture thereof as an output. Alternatively, a first sub-part of the low frequency part of the audio signal (comprising a first part $\Delta f_{LF-1}$ of the LF-bandwidth $\Delta f_{LF}$) is picked up by the microphone and fed to the selector unit as a first input and a second sub-part of the low frequency part of the audio signal (comprising a second part $\Delta f_{LF-2}$ of the LF-bandwidth $\Delta f_{LF}$) is received via the Wireless link and fed to the selector unit as a second input. In this case, the selector unit (SEL) is adapted to combine the first and second inputs to provide a combined low frequency part of the audio signal to the signal processing unit (DSP), the combined signal having an LF-bandwidth $\Delta f_{LF}$. The latter has the advantage that even less link-bandwidth is required (thereby saving power or enabling an increased transmission range).

The received signal $W(\Delta f_{LF})$ from the Wireless link is in an embodiment based on a signal from a communication device, e.g. an entertainment device, a mobile telephone or an audio selection device for selecting an audio signal among a multitude audio signals and transmitting the selected one to the listening device. In an embodiment, the communication device streams an LF signal part of an audio signal to the listening device (e.g. a hearing aid), where it is processed and the full-bandwidth signal subsequently created, whereby power or bandwidth is saved (or transmission-range can be increased). In an embodiment, the electric input signal $I(\Delta f_{LF})$ ($I'(\Delta f_{LF})$) is split into frequency bands (in a separate time-to-frequency (t->f) conversion unit or in the signal processing unit (DSP)), which together constitute the low frequency part of the audio signal, and the frequency bands are individually processed in the DSP and then bandwidth-extended.

FIG. 5 shows an embodiment of a listening system according to the invention. The listening system of FIG. 5 comprises the same elements as the embodiment of the listening device shown in FIG. 4 and mentioned above. The system of FIG. 5 comprises, however, first 51 and second 52 physically separate devices. The first device 51 is a portable listening device, e.g. comprising a part of a hearing instrument, adapted for presenting an electrical output audio signal to a wearer of the first listening device 51, the electrical output audio signal having a full bandwidth $\Delta f_{full}$ comprising a low frequency part and a high frequency part. The second device 52 comprises a transceiver comprising a transmitter for wirelessly transmitting the low frequency signal $W(\Delta f_{LF})$ to the first device 51 via a Wireless link. The first device 51 comprises a transceiver comprising an antenna and a receiver (Rx) for receiving and demodulating the received signal and providing a digitized low frequency signal $I(\Delta f_{LF})$, which is fed to the signal processing unit (DSP), possibly comprising t->f conversion capability (e.g. to enable signal processing in the (time-) frequency domain). The system shown in FIG. 5 can comprise or consist of an embodiment of a listening device as e.g. shown in FIG. 3 or 4 where the microphone is located in a first physical device while other functional blocks of the listening device (e.g. processing and bandwidth extension) are located in a second physical device, and where the two devices are connected via a Wireless link. The first device 51 may in an embodiment be a listening device as shown in FIG. 4, were the microphone of the second device 52 is an additional microphone to the one present in the (first) listening device 51, and where the signal used for processing in the digital signal processing unit (DSP) is selectable via control signal SL. Alternatively, the signal used for processing in the digital signal processing unit (DSP) is a combination (e.g. a sum, e.g. a weighted sum) of the two input signals (I, I').

FIG. 6 shows another embodiment of a listening system according to the present disclosure, the system comprising a (first) listening device (LD or 1$^{st}$ Device in FIG. 6) worn by a user U (e.g. at or in an ear) and wirelessly coupled to a (second) audio gateway device (2$^{nd}$ Device in FIG. 6).

Figure 6A:
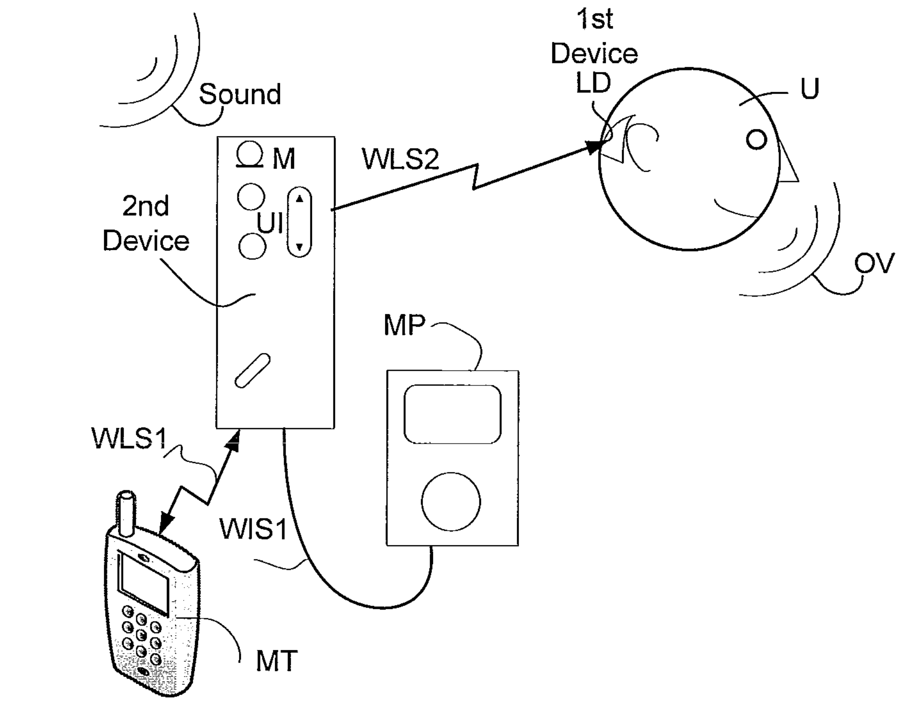
FIG. 6 shows another embodiment of a listening system according to the invention, the system comprising a (first) listening device wirelessly coupled to a (second) audio gateway device, FIG. 6*a* illustrating a possible configuration of the system, FIG. 6*b* showing a (partial) block diagram of the audio gateway device, and FIG. 6*c* illustrating a particular use of the system.

FIG. 6*a* shows a user U wearing the listening device LD (the listening device LD e.g. implementing a hearing aid comprising a behind the ear (BTE) part located behind the ear of the user U). The listening instrument LD is adapted to receive an audio signal from the audio gateway (2$^{nd}$ Device) as a direct electric input, here a wireless input received via a wireless link WLS2. The audio gateway is adapted for receiving a number of audio signals from a number of audio sources, here (1) a mobile telephone MT (e.g. a cellular telephone) via wireless link WLS1, and (2) an audio entertainment device MP (e.g. a music player) via wired connection WIS1, and for transmitting a selected one of the audio signals to the listening device LD via wireless link WLS2. The audio gateway comprises a microphone M for picking up sounds in its environment, e.g. the user U's own voice OV in connection with a telephone conversation. The audio gateway further comprises a user interface UI (comprising activation elements or zones, e.g. in the form of a touch sensitive display and/or a number of push buttons or selection wheels) for allowing a user U to influence the functioning of the system, e.g. a volume setting, a program selection, the selection of an input to be transmitted to the listening device, etc. The listening device LD may e.g.—in addition to the direct electric input—comprise an input transducer (e.g. a microphone system) for picking up sounds from the environment of the user and converting the input sound signal to an electric microphone signal (cf. e.g. FIG. 4). The (time varying) local acoustic environment around the user U comprises e.g. the user's own voice OV and other sounds Sound. Details of the audio gateway device (2$^{nd}$ device) are shown in FIG. 6*b*.

Figure 6B:
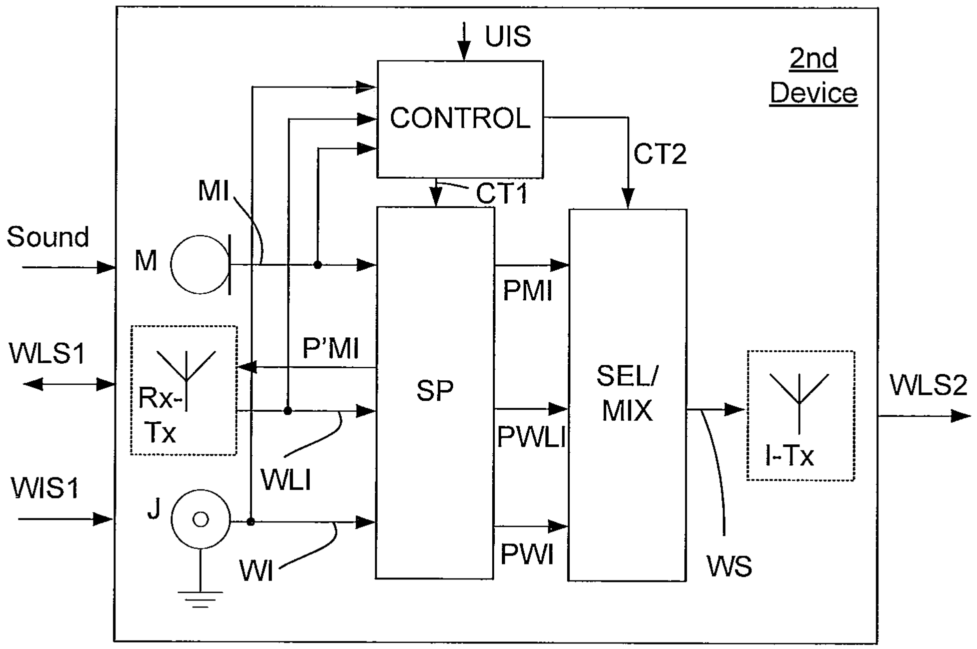

FIG. 6*b* shows a (partial) block diagram of the audio gateway device (2$^{nd}$ Device). The audio gateway comprises an input transducer M (here a microphone) for converting a Sound in the local environment (e.g. comprising a user's own voice, cf. OV in FIGS. 6*a*, 6*c*) to an electric microphone signal MI. The electric microphone signal MI is connected to a signal processing unit SP and to a control unit CONTROL. The audio gateway further comprises a wireless interface for receiving an audio signal from an audio source (e.g. a telephone (cf. MT in FIGS. 6*a*, 6*c*), such as a cellular telephone), here a two-way wireless link WLS1 and antenna and transceiver circuitry Tx-Rx are indicated (e.g. based on Bluetooth or DECT or ZigBee or any other standardized or proprietary scheme). A received (and demodulated) audio signal WLI is connected to the signal processing unit SP and to the control unit CONTROL. The signal processing unit feeds a signal P'MI to be transmitted on the wireless link WLS1 (e.g. based on a signal picked up by the input transducer M, e.g. a user's voice OV in connection with a telephone conversation established via the wireless link WLS1) to the antenna and transceiver circuitry Tx-Rx. The audio gateway further comprises a direct electric wired input, here shown as a jack connector input adapted for receiving a wired input signal WIS1, e.g. from an audio delivery device, e.g. a music player (cf. MP in FIGS. 6*a*, 6*c*). The input signal WI from the direct electric input is connected to the signal processing unit SP and to the control unit CONTROL. The signal processing unit SP is adapted to process the input signals MI, WLI and WI, including to limit the bandwidth of the signals to a predetermined low frequency range $\Delta f_{LF}$. The signal processing unit SP (or any other unit in the audio gateway device) may e.g. comprise A/D and D/A conversion units, and/or time to time-frequency conversion and time-frequency to time conversion blocks to allow signal processing to be performed in a frequency domain, typically in a digital framework. The signal processing unit is connected to a selector and/or mixing unit SEL/MIX in the form of processed signals PMI, PWLI and PWI, respectively. In one (telephone-) mode of operation of the system, a processed (frequency limited) version P'MI of the electric microphone signal MI is fed from the signal processing unit SP to the antenna and transceiver circuitry Tx-Rx and e.g. transmitted to a telephone apparatus nearby. The P'MI signal is e.g. a copy of the processed electric microphone signal PMI (or specifically processed to be transmitted via a telephone channel). The selector and/or mixing unit SEL/MIX is adapted to select one of or provide a weighted mixture of the input signals PMI, PWLI and PWI, and provide the resulting signal as an output signal WS, which is connected to antenna and transceiver circuitry I-Tx. The selector and/or mixing unit SEL/MIX controls the output signal WS via input control signal CT2 from the control unit CONTROL. In an embodiment, the selector and/or mixing unit SEL/MIX selects one of the input signals PMI, PWLI and PWI, as an output signal WS based on a user input UIS. The control unit CONTROL provides control inputs CT1 and CT2 to the signal processing unit SP and the selector/mixer unit SEL/MIX, respectively, based on inputs from a user U via a user interface UI, which generates one or more user input signals UIS. The control input CT1 to the signal processing unit SP can e.g. comprise a control signal for routing a processed electric microphone signal P'MI to the antenna and transceiver circuitry Tx-Rx based on a user's acceptance or initiation of a telephone call via the user interface UI ('telephone-mode'). In an embodiment, control signals CT1 and/or CT2 are influenced by or generated based on characteristics of the input signals MI, WLI and WI extracted by the control unit CONTROL. The selected, frequency limited output signal WS is transmitted by antenna and transceiver circuitry I-Tx via (here inductive) wireless link WLS2 to the corresponding antenna and transceiver circuitry I-Rx of the listening device LD (cf. FIG. 6*c*). The link may e.g. be based on a digital protocol, as e.g. described in US 2005/0255843 A1. This has the advantage of avoiding applying a digital to analogue conversion of the output signal WS before the transmission to the listening device (and vice versa in the listening device LD). The output signal WS can e.g. be a time-variant digital signal as provided by the signal processing unit SP in the form of processed output signals PMI, PWLI and PWI (or, alternatively, as provided by the selector/mixing unit SEL/MIX in that time-frequency to time conversion functionality is included in the SEL/MIX block instead of in the SP block). It is to be understood that a major part of the functionalities of the signal processing unit and of other functional blocks of the listening system (including e.g. an audio gateway and a listening device) can be implemented in software or hardware as is most practical in the application at hand.

Figure 6C:
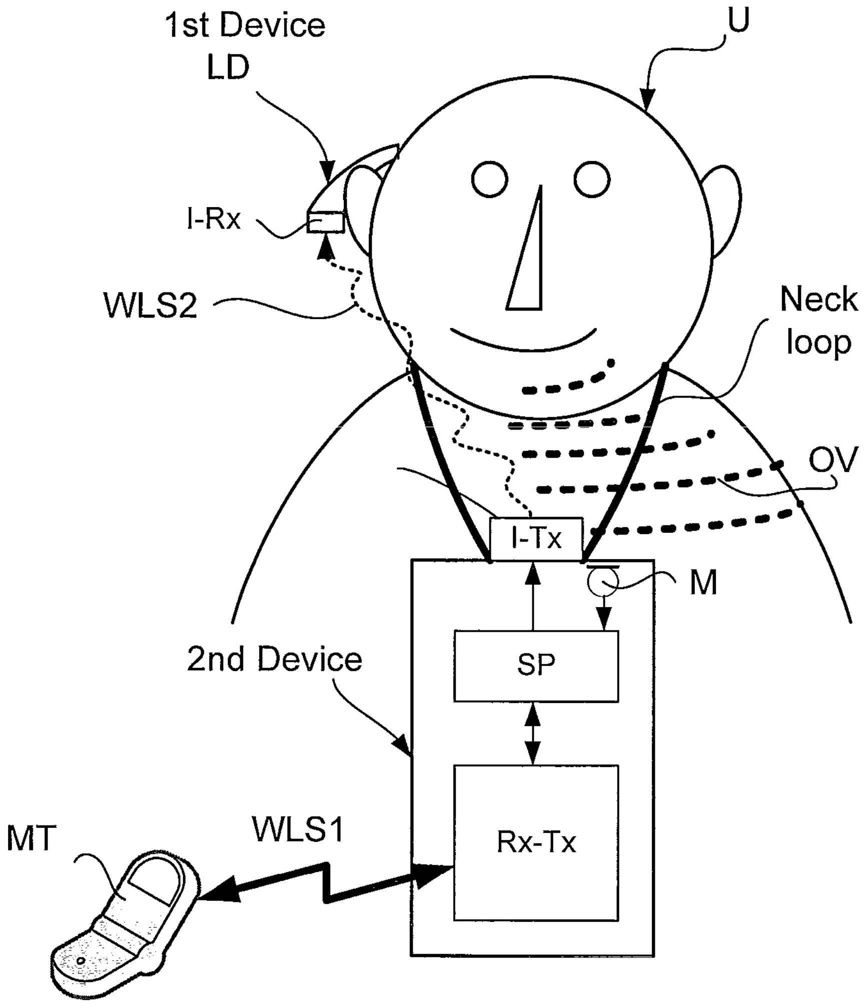

FIG. 6*c* illustrates a special use or mode of the setup of a listening system as shown in FIG. 6*a*, namely a telephone-mode, wherein the listening device LD is wirelessly connected with the audio gateway $2^{nd}$ Device thereby establishing a two-way connection between the user U and the mobile telephone MT (in effect a one- or two-way connection from the audio gateway to the listening device (here a one-way connection is assumed) and a two-way connection from the audio gateway to the mobile telephone). The audio gateway is adapted to be worn around the neck of a user U in a neck strap Neck loop. The audio gateway comprises a signal processing unit SP, a microphone M and at least one receiver of an audio signal, e.g. from a cellular phone MT as shown (e.g. an antenna and receiver circuitry for receiving and possibly demodulating a wirelessly transmitted signal, cf. link WLS1 and Rx-Tx unit in FIGS. 6*b*, 6*c*). The listening device LD and audio gateway are connected via a wireless link WLS2, e.g. an inductive link, e.g. a one-way link, where an audio signal is transmitted via inductive transmitter I-Tx of the audio gateway to the inductive receiver I-Rx of the listening device LD. In the present embodiment, the wireless transmission is based on inductive coupling between coils in the two devices or between a neck loop antenna (e.g. embodied in neck strap Neck loop) distributing the field from a coil in the audio gateway (or alternatively constituting the antenna coil of the audio gateway) to the coil of the listening device LD (e.g. a hearing aid). The audio gateway device may form part of another device, e.g. a mobile telephone or a remote control for the listening device LD. The listening device LD is adapted to be worn on the head of the user U, such as at or in the ear (e.g. a hearing aid of the BTE- or ITE-type) of the user U. The microphone M of the audio gateway device can e.g. be adapted to pick up the user's voice OV during a telephone conversation (and transmit the picked up signal to the mobile telephone MT via wireless link WLS1) and/or other sounds in the environment of the user. The microphone M can e.g. be manually switched off by the user U (e.g. via user interface UI). The signal processing unit SP of the audio gateway device is adapted for limiting the selected audio signal (here from the mobile telephone MT) to a low frequency bandwidth signal (e.g. limited to frequencies below a maximum low frequency $f_{LF,max}$, e.g. ≤3 400 Hz) before transmitting it to the listening device via inductive link WLS2. An embodiment of an audio gateway is described in connection with FIG. 6*b* above. Other (e.g. higher) maximum low frequency limits, $f_{LF,max}$, can e.g. be used when transmitting an input signal of an audio delivery device such as a music player (MP in FIG. 6*a*) from the audio gateway to the listening device.

An audio selection device (audio gateway device), which may be modified and used according to the present invention is e.g. described in EP 1 460 769 A1 and in EP 1 981 253 A1.

The invention is defined by the features of the independent claim(s). Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

EP 1367566 (CODING TECHNOLOGIES) 3 Dec. 2003
WO 2007/006658 (OTICON A/S) 18 Jan. 2007
[Murakami et al., 2002] T. Murakami, M. Namba, T. Hoya, Y. Ishida, *Speech enhancement based on a combined higher frequency regeneration technique and RBF networks*, Proc. Of IEEE TENCON'02, Beijing, China, 2002, Vol. 1, pp. 457-460.
US 2007/0124140 A1 (Iser, Schmidt) 31 May 2007
US 2005/0255843 A1 (Hilpisch et al.) 17 Nov. 2005
EP 1 460 769 A1 (PHONAK) 22 Sep. 2004
EP 1 981 253 A1 (OTICON) 15 Oct. 2008

The invention claimed is:

1. A method of reducing power consumption in a binaural listening system that processes an audio signal in a portable hearing aid of the binaural listening system, the audio signal comprising a low frequency part having an LF-bandwidth $\Delta f_{LF}$ and a high-frequency part having a HF-bandwidth $\Delta f_{HF}$, the method comprising:

providing a first portable hearing aid and a second portable hearing aid;

receiving power in each of the first and second portable hearing aids from a local source of energy in each respective portable hearing aid;

providing an audio input signal consisting of said low frequency part having an LF-bandwidth $\Delta f_{LF}$ to the second portable hearing aid;

performing signal processing on the low frequency part of the audio signal by the second portable hearing aid;

wirelessly transmitting the low frequency part from the second portable hearing aid to the first portable hearing aid;

receiving the transmitted low frequency part by the first portable hearing aid; and performing a bandwidth extension process on said low frequency part of the audio signal by the first portable hearing aid to generate said high-frequency part of the audio signal, thereby generating or regenerating an audio output signal with a full bandwidth $\Delta f_{full}$ comprising said LF-bandwidth $\Delta f_{LF}$ and said HF-bandwidth $\Delta f_{HF}$, wherein the LF-bandwidth $\Delta f_{LF}$ constitutes 0.7 times or less of the full bandwidth $\Delta f_{full}$ of the audio signal, and the performing of said signal processing includes performing at least a majority of the processing steps of introducing frequency dependent gain;

compression;

noise reduction;

feedback suppression; and extraction of directionality information on the low frequency part of the audio signal.

2. A method according to claim 1 wherein the high-frequency part of the signal is generated by spectral band replication.

3. A method according to claim 1 wherein the LF-bandwidth and the HF-bandwidth together constitute the full bandwidth.

4. A method according to claim 1, wherein the signal processing comprises all of the following signal processing steps:

(a) introducing frequency dependent gain, (b) compression, (c) noise reduction, (d) feedback suppression, and (e) extraction of directionality information.

5. A method according to claim 1, wherein the low frequency part of the audio signal or a part thereof is picked up by a microphone of the portable hearing aid and filtered by a low pass filter and/or digitized with an appropriate sample frequency.

6. A method according to claim 1, wherein the full bandwidth audio signal is fed to an output transducer for presentation to a wearer of the first portable hearing aid.

7. A binaural listening system, comprising:

first and second portable hearing aids, each being configured to present an electrical output audio signal to a wearer of the hearing aid, the electrical output audio signal having a full bandwidth $\Delta f_{full}$ comprising a low frequency part with LF-bandwidth $\Delta_{LF}$ and a high frequency part with HF-bandwidth $\Delta f_{HF}$, wherein the second portable hearing aid includes a local source of energy within the second portable hearing aid powering the second portable hearing aid, a wireless transmitter for wirelessly transmitting the low frequency part of the electrical output audio signal with the bandwidth $\Delta f_{LF}$ to the first portable hearing aid, the first portable hearing aid includes a wireless receiver for receiving said low frequency part of the electrical output audio signal, a signal processor configured to process the low frequency part of the electrical output aidio signal and configured to provide a processed low bandwidth signal, a local source of energy within said first portable hearing aid powering the first portable hearing aid, and a bandwidth extension unit for constructing or re-generating the high-frequency part of the electrical output audio signal, the high-frequency part having the HF-bandwidth $\Delta f_{HF}$, and for forming the electrical output audio signal having the full bandwidth $\Delta f_{full}$ based on or comprising said low frequency part having the LF-bandwidth $\Delta f_{LF}$ and said high frequency part having the HF-bandwidth $\Delta f_{HF}$, the LF-bandwidth $\Delta f_{LF}$ constitutes 0.7 times or less of the full bandwidth $\Delta f_{full}$ of the audio signal, and said signal processor is configured to perform at least a majority of introducing frequency dependent gain;

compression;

noise reduction;

feedback suppression; and extraction of directionality information on the low frequency part of the audio signal.

8. A binaural listening system according to claim 7, wherein the second portable hearing aid comprises:

an input transducer for converting an input sound to an electric input signal; and a frequency limiting unit for generating said low frequency part having the LF-bandwidth $\Delta f_{LF}$ for being wirelessly transmitted to the first portable hearing aid.

9. A binaural listening system according to claim 7, wherein the second portable hearing aid comprises:

an electric interface for receiving a signal comprising an audio signal and providing an electric input signal, and a frequency limiting unit for generating said low frequency part having the LF-bandwidth $\Delta f_{LF}$ for being wirelessly transmitted to the first portable hearing aid from said electric input signal.

10. A binaural listening system according to claim 7, wherein said wireless transmitter and receiver are adapted to provide an inductive coupling between the first and second portable hearing aids on which said transmission of said low frequency signal can be based, when said first and second portable hearing aids are located in an operational distance from each other.

11. The method according to claim 1, further comprising:

processing the audio signal based on a hearing profile of a hearing-impaired user of the binaural listening system.

12. The binaural listening system according to claim 7, wherein the signal processor of the second portable hearing aid is further configured to process the audio signal based on a hearing profile of a hearing-impaired user of the binaural listening system.

* * * * *